United States Patent
Chen et al.

(10) Patent No.: US 11,910,457 B2
(45) Date of Patent: Feb. 20, 2024

(54) UNICAST SIDELINK ACCESS STRATUM LEVEL CONNECTION MAINTENANCE

(71) Applicant: Apple Inc., Cupertino, CA (US)

(72) Inventors: Yuqin Chen, Shenzhen (CN); Murtaza A. Shikari, Mountain View, CA (US); Sree Ram Kodali, Sunnyvale, CA (US); Srirang A. Lovlekar, Cupertino, CA (US); Sethuraman Gurumoorthy, San Jose, CA (US); Haitong Sun, Irvine, CA (US); Fangli Xu, Beijing (CN); Haijing Hu, Beijing (CN); Dawei Zhang, Saratoga, CA (US); Srinivasan Nimmala, San Jose, CA (US); Longda Xing, San Jose, CA (US); Xu Ou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 16/739,952

(22) Filed: Jan. 10, 2020

(65) Prior Publication Data
US 2020/0252989 A1    Aug. 6, 2020

Related U.S. Application Data

(60) Provisional application No. 62/799,586, filed on Jan. 31, 2019.

(51) Int. Cl.
*H04W 76/18*    (2018.01)
*H04W 76/25*    (2018.01)
(Continued)

(52) U.S. Cl.
CPC .......... *H04W 76/18* (2018.02); *H04L 1/0026* (2013.01); *H04L 5/0055* (2013.01); *H04W 4/40* (2018.02);
(Continued)

(58) Field of Classification Search
CPC ..... H04W 76/18; H04W 76/25; H04W 24/08; H04W 76/19; H04W 80/08; H04W 4/40;
(Continued)

(56) References Cited

U.S. PATENT DOCUMENTS 10,136,372 B2    11/2018    Jung et al.
10,517,110 B2    12/2019    Dinan et al.
(Continued)

*Primary Examiner* — Peter P Chau
(74) *Attorney, Agent, or Firm* — Kowert, Hood, Munyon, Rankin & Goetzel, P.C.

(57) ABSTRACT

Embodiments are presented herein of apparatuses, systems, and methods for performing unicast sidelink access stratum level connection maintenance. A first wireless device and a second wireless device may establish a unicast sidelink wireless connection. One or both of the first wireless device and the second wireless device may perform access stratum level connection maintenance on the unicast sidelink wireless connection. This may include performing any or all of radio link monitoring, radio resource management, or physical layer based link quality detection. The access stratum and the non-access stratum of each device may also communicate with each other regarding either or both of link quality or link status of the unicast sidelink wireless connection.

20 Claims, 6 Drawing Sheets

(51) Int. Cl.
  *H04W 24/08* (2009.01)
  *H04L 1/00* (2006.01)
  *H04W 76/19* (2018.01)
  *H04W 80/08* (2009.01)
  *H04W 4/40* (2018.01)
  *H04W 76/27* (2018.01)
  *H04L 5/00* (2006.01)
  *H04W 92/18* (2009.01)

(52) U.S. Cl.
  CPC ............ *H04W 24/08* (2013.01); *H04W 76/19* (2018.02); *H04W 76/25* (2018.02); *H04W 76/27* (2018.02); *H04W 80/08* (2013.01); *H04W 92/18* (2013.01)

(58) Field of Classification Search
  CPC ..... H04W 76/27; H04W 92/18; H04W 76/40; H04W 76/23; H04W 4/027; H04W 4/46; H04W 4/44; H04L 1/0026; H04L 5/0055; H04L 5/006; H04L 5/0048
  See application file for complete search history.

(56) References Cited

U.S. PATENT DOCUMENTS

| | | | |
|---|---|---|---|
| 2016/0198504 A1* | 7/2016 | Seo | H04W 72/0473 370/329 |
| 2017/0353819 A1 | 12/2017 | Yin et al. | |
| 2018/0054237 A1* | 2/2018 | Tseng | H04W 36/0033 |
| 2018/0152924 A1 | 5/2018 | Ouchi | |
| 2019/0239112 A1 | 8/2019 | Rao et al. | |
| 2019/0239118 A1 | 8/2019 | Baghel et al. | |
| 2019/0246420 A1 | 8/2019 | Park et al. | |
| 2019/0357292 A1 | 11/2019 | Cirik et al. | |
| 2019/0380159 A1 | 12/2019 | Bangolae et al. | |
| 2020/0007247 A1 | 1/2020 | Gulati et al. | |
| 2020/0145867 A1* | 5/2020 | Tseng | H04L 1/0026 |
| 2020/0229007 A1* | 7/2020 | Jung | H04W 76/10 |

* cited by examiner

UNICAST SIDELINK ACCESS STRATUM LEVEL CONNECTION MAINTENANCE

PRIORITY INFORMATION

This application claims priority to U.S. provisional patent application Ser. No. 62/799,586, entitled "Unicast Sidelink Access Stratum Level Connection Maintenance," filed Jan. 31, 2019, which is hereby incorporated by reference in its entirety as though fully and completely set forth herein.

FIELD

The present application relates to wireless devices, and more particularly to apparatuses, systems, and methods for wireless devices perform unicast sidelink access stratum level connection maintenance in vehicle-to-everything (V2X) wireless cellular communications.

DESCRIPTION OF THE RELATED ART

Wireless communication systems are rapidly growing in usage. One proposed use of wireless communications is in vehicular applications, particularly in V2X (vehicle-to-everything) systems. V2X systems allow for communication between vehicles (e.g., via communications devices housed in or otherwise carried by vehicles), pedestrian UEs (including UEs carried by other persons such as cyclists, etc.), and other wireless communications devices for various purposes, such as to coordinate traffic activity, facilitate autonomous driving, and perform collision avoidance.

The increased communication requirements of certain V2X systems may strain the power and resource capabilities of portable, battery-powered UE devices. In addition, legacy UEs that are unable to communicate in a sidelink manner with neighboring UEs (without an intermediary base station) may present issues in participating in V2X systems. Accordingly, improvements in the field would be desirable.

SUMMARY

Embodiments are presented herein of apparatuses, systems, and methods for performing unicast sidelink access stratum level connection maintenance in vehicle-to-everything (V2X) wireless cellular communications.

The unicast sidelink access stratum level connection maintenance may include any or all of radio link monitoring, radio resource management, and/or physical layer detection based techniques. Such techniques may be beneficial to help detect if a pair of wireless devices that has established a unicast sidelink wireless connection have moved too far apart for the unicast sidelink wireless connection, and/or to reconfigure the unicast sidelink wireless connection in view of current radio conditions. Using such techniques, a wireless device may also be able to better ensure that the radio link for a unicast sidelink connection is in good condition and can meet the Quality of Service requirements of the data being transmitted over the radio link than if the sidelink connection maintenance were left exclusively to upper (e.g., non-access stratum) layers.

Further, such access stratum level connection assessment and maintenance may enable the access stratum layers to provide link quality indications for a unicast sidelink connection to the upper layers, which may better support the upper layer decision making regarding whether to attempt to transmit data on a unicast sidelink connection and/or whether to release, maintain, or re-establish the unicast sidelink connection at the upper layers.

Similarly, indications from upper layers to the access stratum layers regarding when a unicast sidelink connection has been released at the upper layers may assist the access stratum layers to know when to release the radio link for the unicast sidelink connection, potentially without the need for access stratum level signaling between the device pair to release the radio link.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
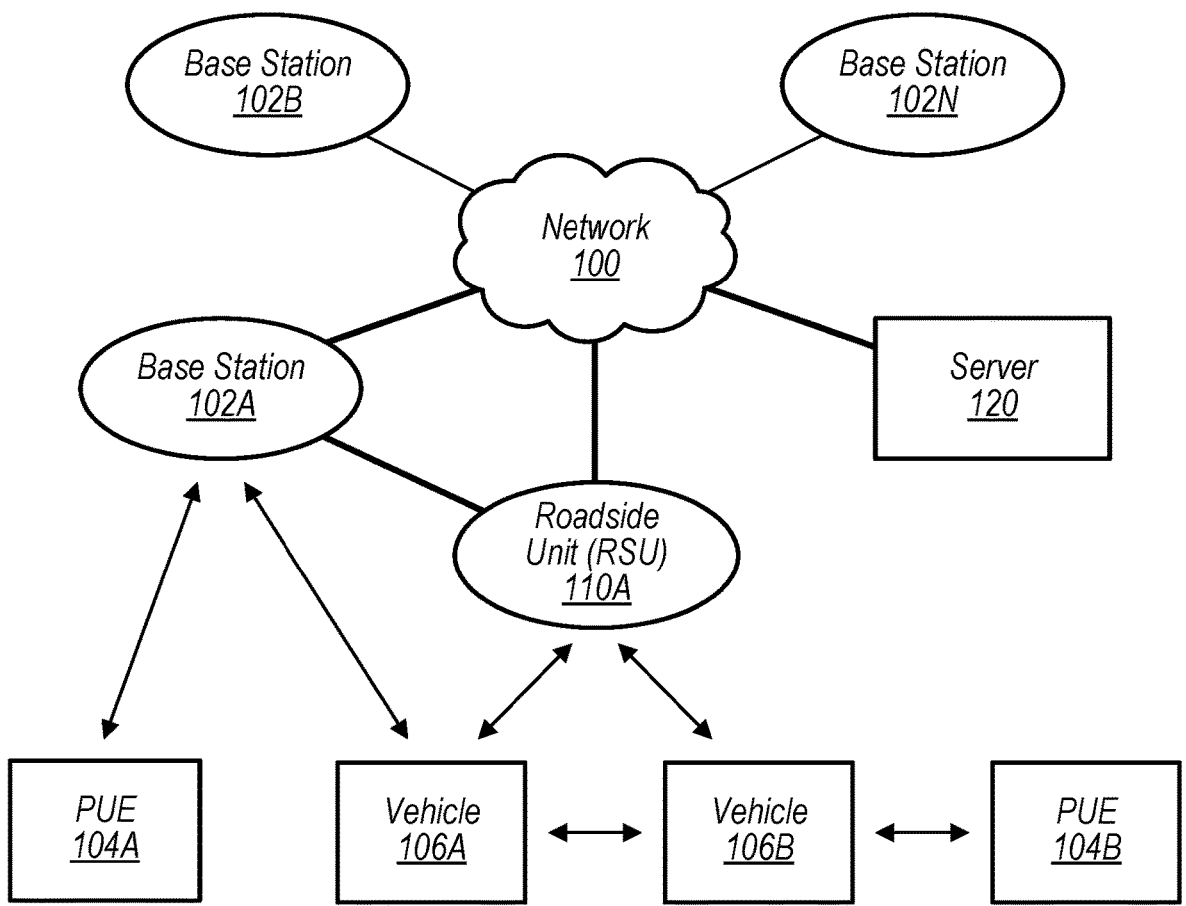
FIG. 1 illustrates an example vehicle-to-everything (V2X) communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Device—as used herein, may refer generally in the context of V2X systems to devices that are associated with mobile actors or traffic participants in a V2X system, i.e., mobile (able-to-move) communication devices such as vehicles and pedestrian user equipment (PUE) devices, as opposed to infrastructure devices, such as base stations, roadside units (RSUs), and servers.

Infrastructure Device—as used herein, may refer generally in the context of V2X systems to certain devices in a V2X system that are not user devices, and are not carried by traffic actors (i.e., pedestrians, vehicles, or other mobile users), but rather that facilitate user devices' participation in the V2X network. Infrastructure devices include base stations and roadside units (RSUs).

User Equipment (UE) (or "UE Device")—any of various types of computer systems or devices that are mobile or portable and that perform wireless communications. Examples of UE devices include mobile telephones or smartphones (e.g., iPhone™ Android™-based phones), portable gaming devices (e.g., Nintendo DS™, PlayStation Portable™, Gameboy Advance™, iPhone™), laptops, wearable devices (e.g., smartwatch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Pedestrian UE (PUE) Device—a user equipment (UE) device as regarded in the context of V2X systems that may be worn or carried by various persons, including not only pedestrians in the strict sense of persons walking near roads, but also certain other peripheral or minor participants, or potential participants, in a traffic environment. These include stationary persons, persons not on vehicles who may not necessarily be near traffic or roads, persons jogging, running, skating, and so on, or persons on vehicles that may not substantially bolster the UE's power capabilities, such as bicycles, scooters, or certain motor vehicles.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example, circuits such as an ASIC (Application Specific Integrated Circuit), processors and associated memory, portions or circuits of individual processor cores, entire processor cores, individual processors, processor arrays, programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—V2X Communication System

FIG. 1 illustrates an example vehicle-to-everything (V2X) communication system, according to some embodiments. It is noted that the system of FIG. 1 is merely one example of a possible system, and that features of this disclosure may be implemented in any of various systems, as desired.

Vehicle-to-everything (V2X) communication systems may be characterized as networks in which vehicles, UEs, and/or other devices and network entities exchange communications in order to coordinate traffic activity, among other possible purposes. V2X communications include communications conveyed between a vehicle (e.g., a wireless device or communication device constituting part of the vehicle, or contained in or otherwise carried along by the vehicle) and various other devices. V2X communications include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also refer to communications between other non-vehicle devices participating in a V2X network for the purpose of sharing V2X-related information.

V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short- to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs. Certain LTE standards usable in V2X systems may be called LTE-Vehicle (LTE-V) standards.

As shown, the example V2X system includes a number of user devices. As used herein in the context of V2X systems, "user devices" may refer generally to devices that are associated with mobile actors or traffic participants in the V2X system, i.e., mobile (able-to-move) communication devices such as vehicles and pedestrian user equipment (PUE) devices. User devices in the example V2X system include the PUEs 104A and 104B and the vehicles 106A and 106B.

The vehicles 106 may constitute various types of vehicles. For example, the vehicle 106A may be a road vehicle or automobile, a mass transit vehicle, or another type of vehicle. The vehicles 106 may conduct wireless communications by various means. For example, the vehicle 106A may include communications equipment as part of the vehicle or housed in the vehicle, or may communicate through a wireless communications device currently contained within or otherwise carried along by the vehicle, such as a user equipment (UE) device (e.g., a smartphone or similar device) carried or worn by a driver, passenger, or other person on board the vehicle, among other possibilities. For simplicity, the term "vehicle" as used herein may include the wireless communications equipment which represents the vehicle and conducts its communications. Thus, for example, when the vehicle 106A is said to conduct wireless communications, it is understood that, more specifically, certain wireless communications equipment associated with and carried along by the vehicle 106A is performing said wireless communications.

The pedestrian UEs (PUEs) 104 may constitute various types of user equipment (UE) devices, i.e., portable devices capable of wireless communication, such as smartphones, smartwatches, etc., and may be associated with various types of users. Thus, the PUEs 104 are UEs, and may be referred to as UEs or UE devices. Note that although the UEs 104 may be referred to as PUEs (pedestrian UEs), they may not necessarily be carried by persons who are actively walking near roads or streets. PUEs may refer to UEs participating in a V2X system that are carried by stationary persons, by persons walking or running, or by persons on vehicles that may not substantially bolster the devices' power capabilities, such as bicycles, scooters, or certain motor vehicles. Note also that not all UEs participating in a V2X system are necessarily PUEs.

The user devices may be capable of communicating using multiple wireless communication standards. For example, the UE 104A may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS, LTE, LTE-A, LTE-V, HSPA, 3GPP2 CDMA2000, 5G NR, etc.). The UE 104A may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

As shown, certain user devices may be able to conduct communications with one another directly, i.e., without an intermediary infrastructure device such as base station 102A or RSU 110A. As shown, vehicle 106A may conduct V2X-related communications directly with vehicle 106B. Similarly, the vehicle 106B may conduct V2X-related communications directly with PUE 104B. Such peer-to-peer communications may utilize a "sidelink" interface such as the PC5 interface in the case of some LTE embodiments. In certain LTE embodiments, the PC5 interface supports direct cellular communication between user devices (e.g., between vehicles 106), while the Uu interface supports cellular communications with infrastructure devices such as base stations. The LTE PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations. For example, NR V2X sidelink communication techniques can also be used to perform device-to-device communications, at least according to some embodiments. Note also that some user devices in a V2X system (e.g., PUE 104A, as one possibility) may be unable to perform sidelink communications, e.g., because they lack certain hardware necessary to perform such communications.

As shown, the example V2X system includes a number of infrastructure devices in addition to the above-mentioned user devices. As used herein, "infrastructure devices" in the context of V2X systems refers to certain devices in a V2X system which are not user devices, and are not carried by traffic actors (i.e., pedestrians, vehicles, or other mobile users), but rather which facilitate user devices' participation in the V2X network. The infrastructure devices in the example V2X system include base station 102A and roadside unit (RSU) 110A.

The base station (BS) 102A may be a base transceiver station (BTS) or cell site (a "cellular base station"), and may include hardware that enables wireless communication with user devices, e.g., with the user devices 104A and 106A.

The communication area (or coverage area) of the base station may be referred to as a "cell" or "coverage". The base station 102A and user devices such as PUE 104A may be configured to communicate over the transmission medium using any of various radio access technologies (RATs), also referred to as wireless communication technologies, or telecommunication standards, such as GSM, UMTS, LTE, LTE-Advanced (LTE-A), LTE-Vehicle (LTE-V), HSPA, 3GPP2 CDMA2000, 5G NR, etc. Note that if the base station 102A is implemented in the context of LTE, it may alternately be referred to as an eNodeB', or eNB. Note that if the base station 102A is implemented in the context of NR, it may alternately be referred to as a 'gNodeB', or gNB.

As shown, the base station 102A may also be equipped to communicate with a network 100 (e.g., the V2X network, as well as a core network of a cellular service provider, a telecommunication network such as a public switched telephone network (PSTN), and/or the Internet, among various possibilities). Thus, the base station 102A may facilitate communication between user devices and/or between user devices and the network 100. The cellular base station 102A may provide user devices, such as UE 104A, with various telecommunication capabilities, such as voice, SMS and/or data services. In particular, the base station 102A may provide connected user devices, such as UE 104A and vehicle 106A, with access to the V2X network.

Thus, while the base station 102A may act as a "serving cell" for user devices 104A and 106A as illustrated in FIG. 1, the user devices 104B and 106B may also be capable of communicating with the base station 102A. The user devices shown, i.e., user devices 104A, 104B, 106A, and 106B may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Roadside unit (RSU) 110A constitutes another infrastructure device usable for providing certain user devices with access to the V2X network. RSU 110A may be one of various types of devices, such as a base station, e.g., a transceiver station (BTS) or cell site (a "cellular base station"), or another type of device that includes hardware that enables wireless communication with user devices and facilitates their participation in the V2X network.

RSU 110A may be configured to communicate using one or more wireless networking communication protocols (e.g., Wi-Fi), cellular communication protocols (e.g., LTE, LTE-V, etc.), and/or other wireless communication protocols. In some embodiments, RSU 110A may be able to communicate with devices using a "sidelink" technology such as LTE PC5 or NR V2X sidelink communication techniques.

RSU 110A may communicate directly with user devices, such as the vehicles 106A and 106B as shown. RSU 110A may also communicate with the base station 102A. In some cases, RSU 110A may provide certain user devices, e.g., vehicle 106B, with access to the base station 102A. While RSU 110A is shown communicating with vehicles 106, it may also (or otherwise) be able to communicate with PUEs 104. Similarly, RSU 110A may not necessarily forward user device communications to the base station 102A. In some embodiments, the RSU 110A and may constitute a base station itself, and/or may forward communications to the server 120.

The server 120 constitutes a network entity of the V2X system, as shown, and may be referred to as a cloud server. Base station 102A and/or RSU 110A may relay certain V2X-related communications between the user devices 104 and 106 and the server 120. The server 120 may be used to process certain information collected from multiple user devices, and may administer V2X communications to the user devices in order to coordinate traffic activity. In various other embodiments of V2X systems, various functions of the cloud server 120 may be performed by an infrastructure device such as the base station 102A or RSU 110A, performed by one or more user devices, and/or not performed at all.

Figure 2:
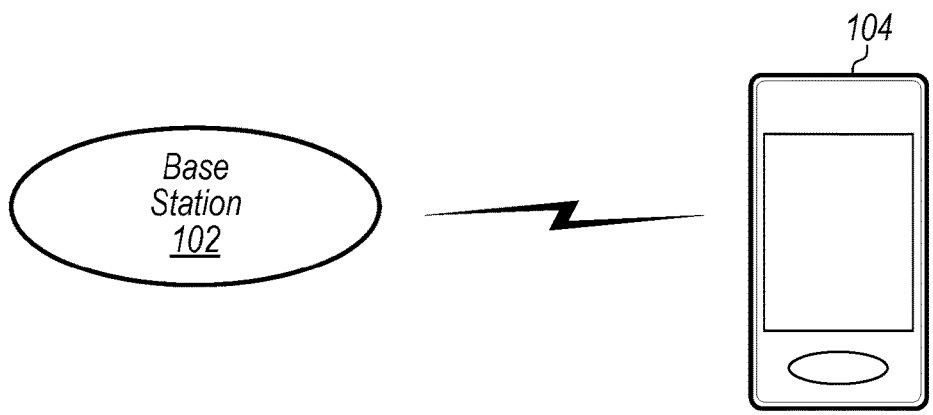
FIG. 2 illustrates a base station in communication with a user equipment (UE) device, according to some embodiments.

FIG. 2—Communication Between a UE and Base Station

FIG. 2 illustrates a user equipment (UE) device 104 (e.g., one of the PUEs 104A or 104B in FIG. 1) in communication with a base station 102 (e.g., the base station 102A in FIG. 1), according to some embodiments. The UE 104 may be a device with cellular communication capability such as a mobile phone, a hand-held device, a wearable device, a computer or a tablet, or virtually any type of portable wireless device.

The UE 104 may include a processor (processing element) that is configured to execute program instructions stored in memory. The UE 104 may perform any of the method embodiments described herein by executing such stored instructions. Alternatively, or in addition, the UE 104 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 104 may include one or more antennas for communicating using one or more wireless communication protocols or technologies. In some embodiments, the UE 104 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 104 may share one or more parts of a receive and/or transmit chain between multiple wireless communication technologies, such as those discussed above.

In some embodiments, the UE 104 may include separate transmit and/or receive chains (e.g., including separate antennas and other radio components) for each wireless communication protocol with which it is configured to communicate. As a further possibility, the UE 104 may include one or more radios which are shared between multiple wireless communication protocols, and one or more radios which are used exclusively by a single wireless communication protocol. For example, the UE 104 might include a shared radio for communicating using either of LTE or 1×RTT (or LTE or NR, or LTE or GSM), and separate radios for communicating using each of Wi-Fi and Bluetooth. Other configurations are also possible.

Figure 3:
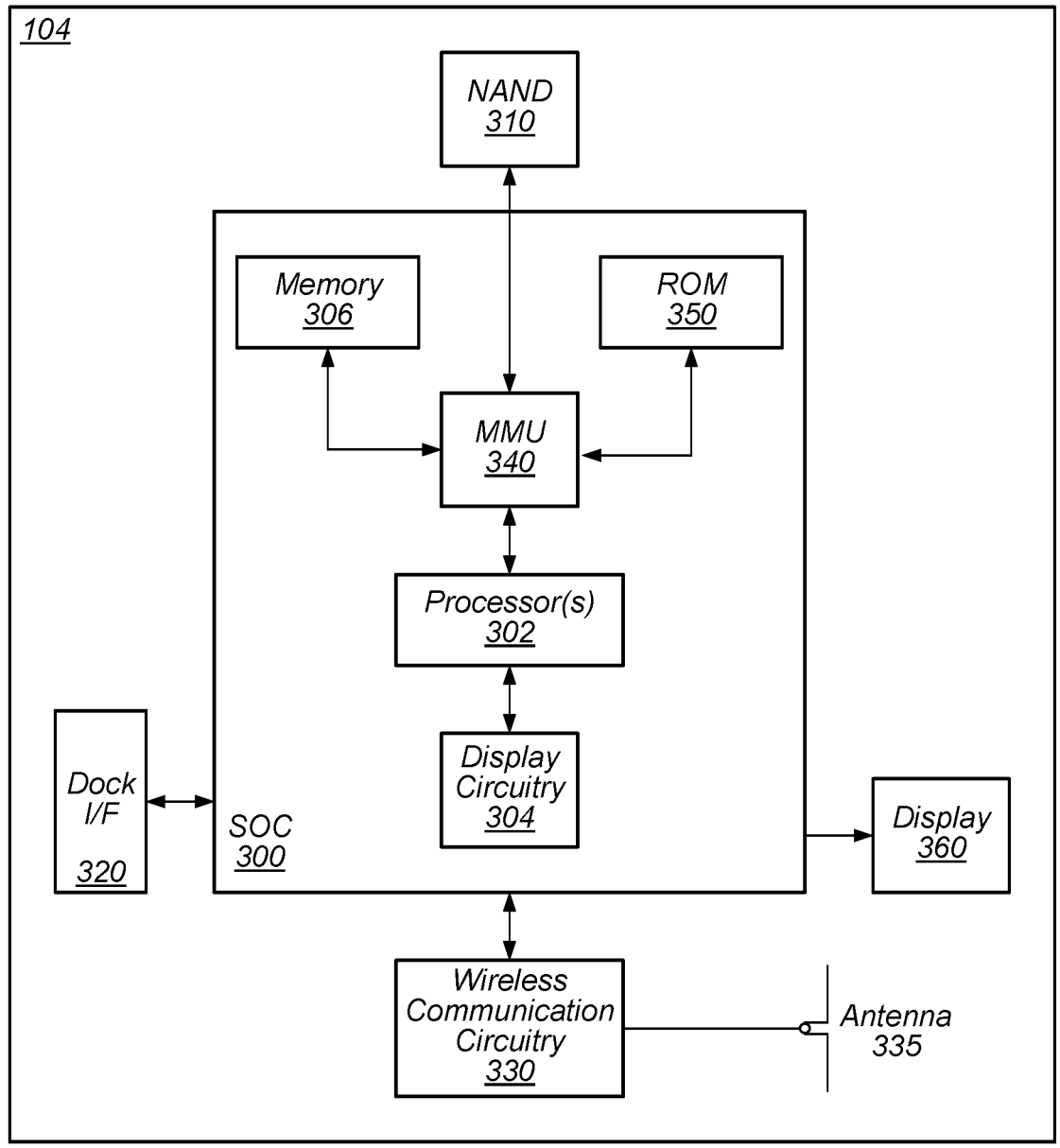
FIG. 3 is an example block diagram of a UE, according to some embodiments.

FIG. 3—Block Diagram of a UE

FIG. 3 illustrates an example block diagram of a UE 104, according to some embodiments. As shown, the UE 104 may include a system on chip (SOC) 300, which may include portions for various purposes. For example, as shown, the SOC 300 may include processor(s) 302 which may execute program instructions for the UE 104 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 104. For example, the UE 104 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, LTE-V, 5G NR, CDMA2000, Bluetooth, Wi-Fi, GPS, etc.). The UE may also include at least one SIM device, and may include two SIM devices, each providing a respective international mobile subscriber identity (IMSI) and associated functionality.

As shown, the UE device 104 may include at least one antenna (and possibly multiple antennas, e.g., for MIMO and/or for implementing different wireless communication technologies, among various possibilities) for performing wireless communication with base stations, access points, and/or other devices. For example, the UE device 104 may use antenna 335 to perform the wireless communication.

The UE 104 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 104 may include hardware and software components for implementing features for performing unicast sidelink access stratum level connection maintenance, such as those described herein. The processor 302 of the UE device 104 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 104, in conjunction with one or more of the other components 300, 304, 306, 310, 320, 330, 335, 340, 350, 360 may be configured to implement part or all of the features described herein, such as the features described herein.

Figure 4:
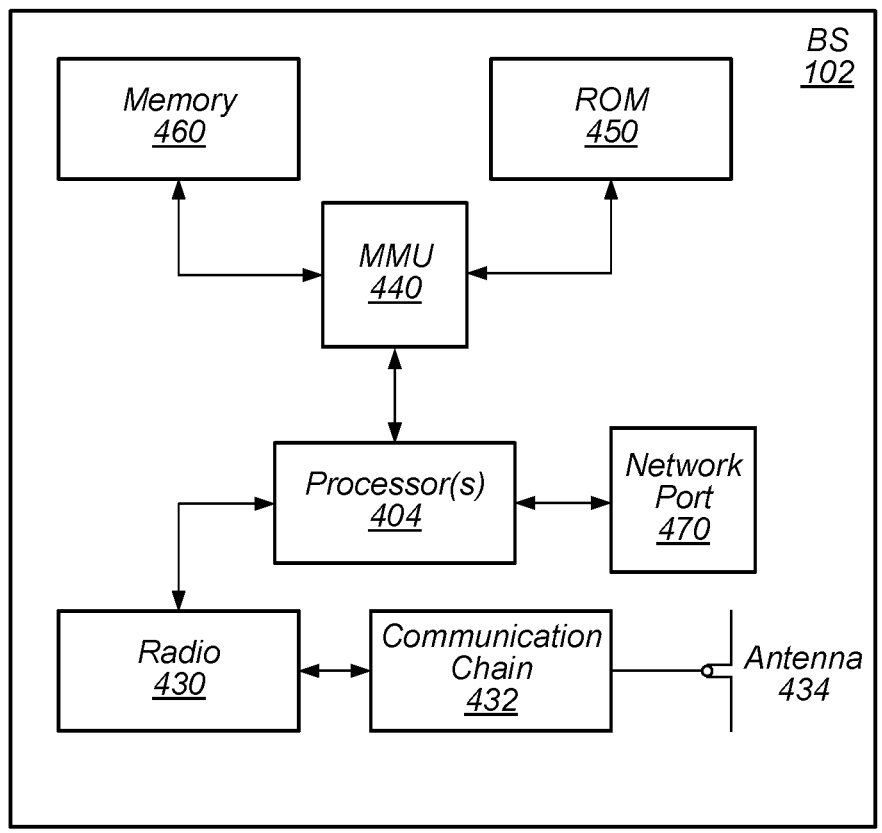
FIG. 4 is an example block diagram of a base station, according to some embodiments.

FIG. 4—Block Diagram of a Base Station

FIG. 4 illustrates an example block diagram of a base station 102 (e.g., base station 102A in FIG. 1), according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 104, access to the telephone network The network port 470 (or an additional network port) may also or alternatively be configured to couple to a cellular network, e.g., a core network of a cellular service provider. The core network may provide mobility related services and/or other services to a plurality of devices, such as UE devices 104. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 104 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, LTE-V, GSM, UMTS, CDMA2000, 5G NR, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Sidelink Communications

In wireless communications, specifically cellular wireless communications, sidelink communications represent a special kind of communication mechanism between devices that is not carried through a base station, e.g., through eNB/gNB. In other words, the devices communicate with each other without that communication going through a base station. In one sense, the devices may be said to be communicating with each other directly. Accommodation of such communication, however, requires a new physical layer design.

Many recent studies have identified the need for technical solutions for sidelink design, e.g., a sidelink design in 5G-NR, to meet the requirements of advanced V2X services, including support of sidelink unicast, sidelink groupcast and sidelink broadcast. A number of specific use cases have been identified for advanced V2X services, categorized into four groups: vehicle platooning, extended sensors, advanced driving, and remote driving. Platooning is a cooperative driving application according to which multiple vehicles travel in the same lane as in a convoy, keeping a specified (preferably constant) inter-vehicle distance between each other in order to increase their traffic efficiency, e.g., to reduce fuel consumption and gas emissions and to achieve safe and efficient transport. To achieve platooning, vehicles in a platoon may use multiple on-board sensors (e.g., radars, lidars—light detection and ranging, positioning systems, etc.) and sidelink vehicle-to-vehicle communications to synchronize their on-road operations, e.g., pertaining to breaking, changing lanes, stopping, etc. Vehicle platooning requires both groupcast transmissions (e.g., for relaying status information for platoon management) and unicast transmissions (e.g., for communication between two members). Efficient intra-platooning communications and inter-platooning communications may help achieve better spectrum/power efficiency while maintaining fair resource competition, e.g., between members of the same platoon and also between platoons (and consequently, between members of different platoons).

FIGS. 5-11—Unicast Sidelink Access Stratum Level Maintenance

In LTE V2X, broadcast sidelink communications are supported, in which maintenance of the sidelink connection is performed using keep-alive messages communicated between upper layers (e.g., application layers, non-access stratum layers, etc.) of the wireless devices in communication.

However, LTE V2X does not support unicast sidelink communications, or the use of link maintenance techniques at the access stratum level. In order to support unicast sidelink (e.g., in NR V2X, or to introduce such techniques to LTE V2X and/or other communication protocols), it may be beneficial to introduce techniques for supporting link maintenance that can be performed at access stratum layers, e.g., to detect if wireless devices have moved too far apart to support a unicast sidelink connection, to maintain the QoS requirements of the bearers established on the link, and/or for any of various other reasons.

Accordingly, various possible such techniques are proposed herein, including the use of sidelink radio link monitoring techniques, sidelink radio resource management techniques, and sidelink physical layer detection techniques.

When performing unicast sidelink communications, it may be the case that a pair of wireless devices performs sidelink radio resource control (RRC) configuration or reconfiguration, e.g., to coordinate a primary carrier. A communication flow diagram illustrating aspects of one such process is illustrated in FIG. 5.

Figure 5:
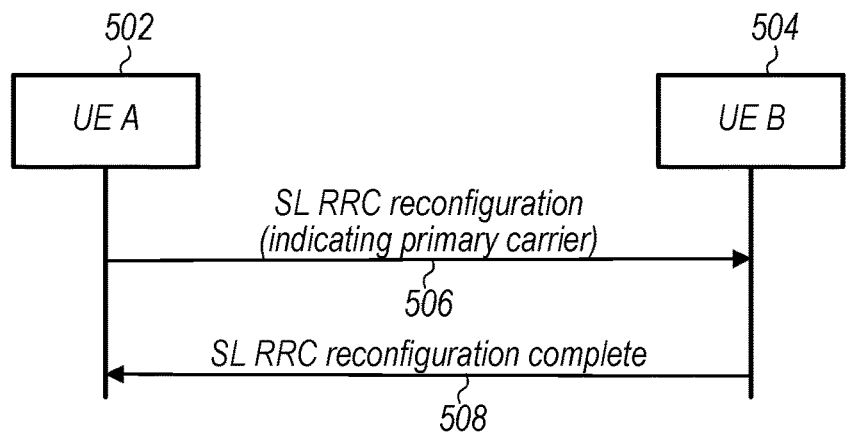
FIG. 5 is a communication flow diagram illustrating aspects of an exemplary sidelink configuration communication sequence between wireless devices, according to some embodiments.

Aspects of the method of FIG. 5 (as well as the methods of FIGS. 6-11) may be implemented by one or more wireless devices, such as a UE 104 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 (as well as the methods of FIGS. 6-11) are described in a manner relating to the use of communication techniques and/or features associated with NR and/or 3GPP specification documents, such description is not intended to be limiting to the disclosure, and aspects of the method of FIG. 5 (as well as the methods of FIGS. 6-11) may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In the illustrated scenario, in 506, a first UE 502 may transmit a sidelink RRC reconfiguration message to a second UE 504. The sidelink RRC reconfiguration message may indicate or propose a sidelink primary carrier if the UE pair is communicating with each other on multiple carriers, and/or may indicate or propose any of various other possible RRC communication parameters for the unicast sidelink wireless connection. In 508, the second UE 504 may respond to the first UE 502 with a sidelink RRC reconfiguration complete message, which may confirm the parameters indicated or proposed in the sidelink RRC reconfiguration message. Alternatively, or additionally, it may be possible for the second UE 504 to counter-propose one or more alternate parameters in response to the sidelink RRC reconfiguration message, in which case the first UE 502 may further respond to complete the sidelink RRC reconfiguration.

Figure 6:
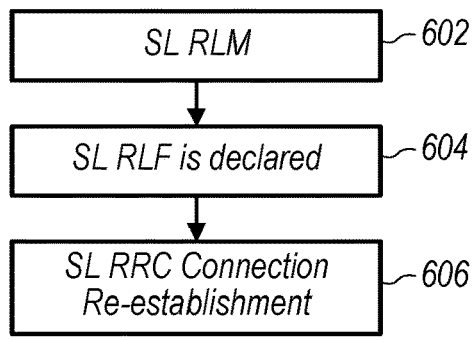
FIG. 6 is a flowchart diagram illustrating aspects of an exemplary technique for performing sidelink access stratum level radio link monitoring, according to some embodiments.

Once a unicast sidelink wireless connection has been established, one or both of the wireless devices may perform one or more access stratum level connection maintenance techniques to support the unicast sidelink wireless connection. At least according to some embodiments, the access stratum level connection maintenance techniques may include one or more radio link monitoring (RLM) techniques. FIG. 6 is a flowchart diagram illustrating a highlevel overview of how such RLM may proceed. In 602, the wireless device may perform sidelink radio link monitoring, which may include evaluating the sidelink radio link quality on a sidelink control channel and/or on sidelink reference signals over a time duration. In 604, when specified conditions for radio link failure (RLF) are met, sidelink RLF may be declared. In 606, when sidelink RLF has been declared, a sidelink RRC connection re-establishment procedure may be performed.

Figure 7:
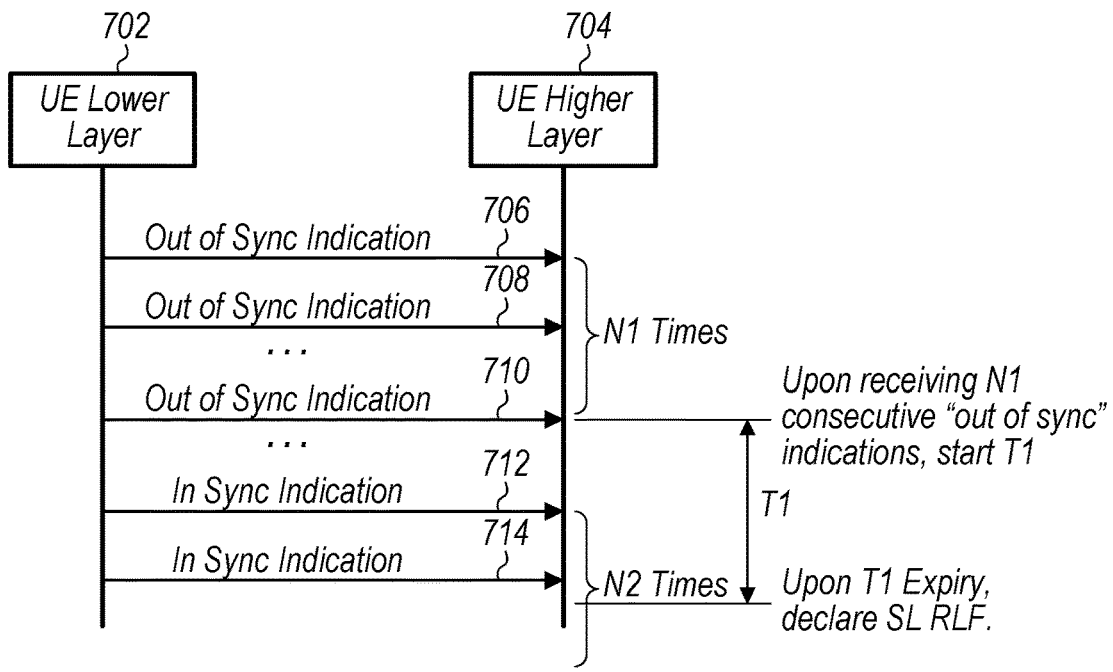
FIGS. 7-9 are communication flow diagrams illustrating aspects of exemplary techniques for performing sidelink access stratum level radio link monitoring, according to some embodiments.

FIG. 7 is a communication flow diagram illustrating one possible approach to performing the radio link monitoring. In the illustrated example, when the sidelink radio link quality is worse than a certain threshold ("$Q_{out}$"), the physical layer (UE lower layer 702) in the wireless device may indicate to the RRC layer (UE higher layer 704) that the wireless device is out-of-sync; otherwise, if the sidelink radio link quality is better than a certain threshold ("$Q_{in}$"), the physical layer in the wireless device may indicate to the RRC layer that the wireless device is in-sync. If the RRC layer of the wireless device receives a specified number ("N1") of consecutive out-of-sync indications (e.g., out of sync indications 706, 708, 710, in the illustrated scenario), the RRC layer may initiate a timer ("T1"). Unless a specified number ("N2") of in-sync indications (e.g., in sync indications 712, 714, in the illustrated scenario) are received prior to expiration of the T1 timer, the RRC layer may declare radio link failure (RLF) for the unicast sidelink wireless connection. As shown, in the illustrated scenario the specified number of in sync indications is not received before expiry of the T1 timer, and so sidelink RLF may be declared. Note that according to the illustrated RLM framework, if N2 consecutive in sync indications were received prior to expiry of the T1 timer, the T1 timer would be stopped, and declaration of RLF would be averted. The values of the N1/N2/T1 parameters may be configured by a serving base station (e.g., gNB) or pre-configured by a V2X proximity services (Prose) function, among various possibilities. Note also that while the illustrated RLM framework represents one possible RLM framework, other approaches and/or variations on the illustrated approach are also possible, according to various embodiments. For example, in some instances, it may (e.g., additionally or alternatively) be possible that sidelink RLF could be declared when a configured maximum number of RLC retransmissions is reached, and/or that sidelink RLF declaration could be based at least in part on HARQ NACK occurrences, according to various embodiments.

The RLM measurements to determine whether the wireless device is in-sync or out-of-sync for any given RLM measurement interval may be performed on a reference signal (e.g., CSI-RS) provided by the other wireless device, e.g., that may be carried on a physical sidelink control channel (PSCCH), in conjunction with sidelink control information (SCI), and/or on a physical sidelink shared channel (PSSCH), in conjunction with data communications, at least according to some embodiments. The reference signals could be provided in a unicast manner (e.g., specifically to the other wireless device of the unicast sidelink wireless connection), or could be broadcast, such that all receiving devices (e.g., that might also be engaged in or interested in unicast sidelink wireless communication with the wireless device transmitting the reference signals) can potentially use the reference signals for sidelink measurements. At least in some instances, a wireless device transmitting reference signals may transmit with different power on a broadcast channel than in a unicast channel, and the delta between such transmission powers may be taken into account by a receiving device, e.g., depending on the channel on which the reference signals are received.

At least according to some embodiments, a wireless device that declares RLF for a unicast sidelink wireless connection may conduct some or all of the following operations. The wireless device may release dedicated physical layer resources and configuration for the wireless device pair, such as sidelink hybrid automatic repeat request (HARM) feedback channel and channel state information report channel configuration. The wireless device may reset its MAC layer (at least with respect to the unicast sidelink wireless connection). The wireless device may suspend any sidelink data radio bearers (DRBs) and any sidelink signaling radio bearers (SRBs), possibly excepting (e.g., at least for a certain duration) a sidelink SRB(1). The access stratum context information for the unicast sidelink wireless connection, such as the UE ID(s), may be maintained. The wireless device may attempt sidelink RRC connection re-establishment. In some instances, the wireless device(s) transmitting sidelink reference signals may continue to transmit the sidelink reference signals after the RLF is declared, e.g., for a pre-determined time duration, for example to support continued sidelink RLM and/or other measurements for the pre-determined time duration. This may help the wireless devices determine whether link quality is good enough that it is likely possible to re-establish the unicast sidelink wireless connection, or link quality is poor enough that attempting to re-establish the unicast sidelink wireless connection is likely to be unsuccessful. Alternatively, it may be the case that the wireless device(s) transmitting sidelink reference signals may stop transmitting sidelink reference signals once RLF is declared. Note that either of these scenarios may represent a difference from infrastructure mode communications, e.g., in which a cellular base station may typically provide reference signals continuously regardless of whether any specific wireless device has a radio link with a cell provided by the cellular base station, at least according to some embodiments.

Figure 8:
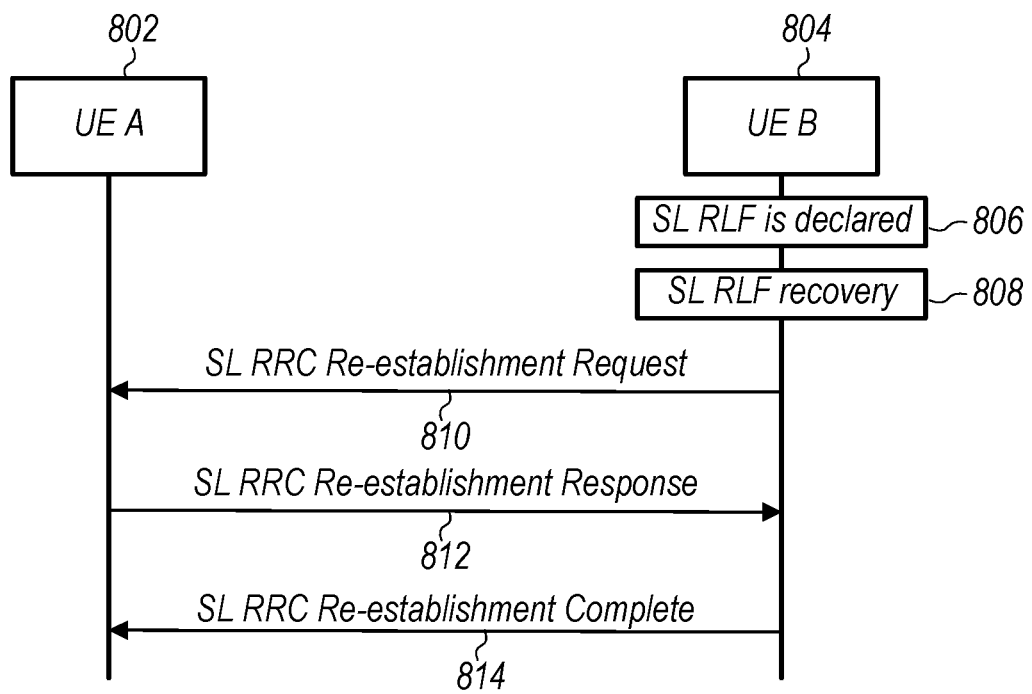

In case such continued reference signals are available and a wireless device is able to determine that link quality is good enough that it is likely possible to re-establish the unicast sidelink wireless connection after RLF is declared, the wireless device may re-establish the sidelink RRC connection and recover all of the sidelink DRB(s) and sidelink SRB(s) configuration, by performing a sidelink RRC connection re-establishment procedure. FIG. 8 is a communication flow diagram illustrating one such possible sidelink RRC connection re-establishment procedure, according to some embodiments. In the illustrated scenario, a first UE 802 and a second UE 804 may have previously established a unicast sidelink wireless connection. In 806, the second UE 804 may declare sidelink RLF, and in 808, the second UE 804 may initiate sidelink RLF recovery.

To initiate the sidelink RLF recovery, in 810, the second UE 804 may transmit a sidelink RRC re-establishment request to the first UE 802. If the first UE 802 has maintained and can find sidelink access stratum context information for the second UE 804, in 812, the first UE 802 may trigger a sidelink RRC re-establishment response message. It may be the case that upon the second UE 804 receiving the message, all of the sidelink DRBs and possibly sidelink SRBs may be recovered. Otherwise, the first UE 802 may re-configure the sidelink DRBs and possibly sidelink SRBs as part of the sidelink RRC re-establishment response message. Optionally, in 814, the second UE 804 may provide a sidelink RRC re-establishment complete message to the first UE 802, e.g., to ensure a consistent configuration in case the first UE 802 re-configures the sidelink DRBs and/or sidelink SRBs.

As previously noted, in some scenarios, it may be the case that the wireless device that is configured to transmit reference signals for the unicast sidelink wireless connection no longer transmits reference signals after RLF is declared. In such a case, sidelink channel quality information may not be available to determine whether link quality is good enough that it is likely possible to re-establish the unicast sidelink wireless connection after RLF is declared. Accordingly, at least as one possibility, it may be the case that a wireless device that declares RLF for a unicast sidelink wireless connection repeatedly or continuously transmits a sidelink RRC re-establishment request after the radio link failure of the unicast sidelink wireless connection has occurred. Alternatively, in such a case, it may be left to upper (e.g., non-access stratum) layers to facilitate re-establishment of the unicast sidelink wireless connection, e.g., by triggering a keep-alive message, or performing one-to-one discovery/communication setup if a keep-alive timer expires, among various possibilities.

Figure 9:
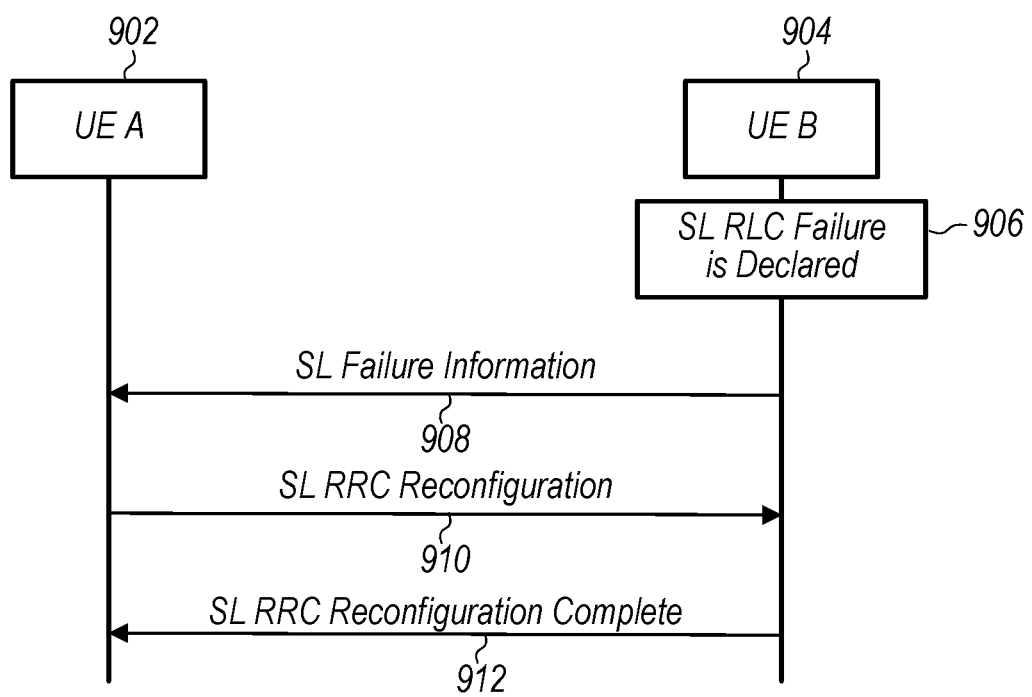

As previously noted, in some instances it may be the case that a pair of wireless devices may communicate using carrier aggregation on a unicast sidelink wireless connection, potentially including using sidelink packet data convergence protocol (PDCP) duplication on the multiple carriers. In such a case, upon indication from the sidelink logical channel that is transmitted on the primary sidelink carrier (or possibly a secondary sidelink carrier) that the maximum number of retransmissions has been reached, the wireless device may also declare RLF and perform sidelink RRC re-establishment such as in the illustrated scenario of FIG. 8. As still another possibility, upon indication from the sidelink logical channel that is only transmitted on the secondary sidelink carrier that the maximum number of retransmissions has been reached, the wireless device may declare radio link control (RLC) failure and report the RLC failure to the other wireless device. The other wireless device may subsequently perform sidelink RRC reconfiguration in view of the sidelink RLC failure report. FIG. 9 is a communication flow diagram illustrating how such a process could proceed, at least according to some embodiments.

Similar to FIG. 8, in the illustrated scenario, a first UE 902 and a second UE 904 may have previously established a unicast sidelink wireless connection. As shown, in 906, the second UE 904 may declare sidelink RLC failure. In 908, the second UE 904 may provide sidelink failure information indicating the sidelink RLC failure to the first UE 902. In 910, the first UE 902 may provide sidelink RRC reconfiguration information to the second UE 904. In 912, the second UE 904 may provide a sidelink RRC reconfiguration complete indication to the first UE 902, completing the reconfiguration process.

Alternatively, or in addition to performing RLM techniques for access stratum level connection maintenance, it may be possible for wireless devices performing unicast sidelink wireless communication to implement one or more radio resource management (RRM) techniques. Sidelink RRM measurements may help wireless devices to maintain a good sidelink channel quality over layer 3 (e.g., RRC), potentially including helping to configure/transmit sidelink DRB(s) with different Quality of Service (QoS) requirements on appropriate sidelink carrier(s), to meet the QoS requirements.

Figure 10:
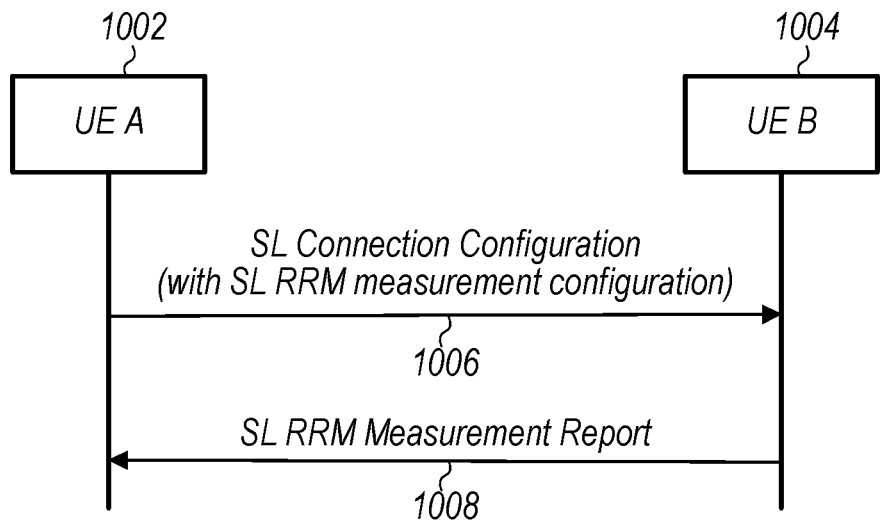
FIGS. 10-11 are communication flow diagrams illustrating aspects of exemplary techniques for performing sidelink access stratum level radio resource management, according to some embodiments.

FIG. 10 is a communication flow diagram illustrating aspects of an exemplary RRM configuration and measurement reporting approach that can be used for unicast sidelink wireless communication, at least according to some embodiments. In the illustrated scenario, in 1006, a first UE 1002 may provide a sidelink connection configuration message to a second UE 1004. The sidelink connection configuration message may include sidelink RRM measurement configuration information, e.g., potentially including what measurements and/or other information to include in RRM measurement reports, and how frequently and/or under what conditions to provide a RRM measurement report.

The sidelink RRM measurement configuration could, for example, include carrier identifier/index information, measurement identifier information, measurement quantity (e.g., sidelink reference signal received power (RSRP), sidelink reference signal received quality (RSRQ), sidelink received signal strength indicator (RSSI), sidelink channel busy ratio (CBR)), measurement report event, etc. The measurements may be performed on the sidelink synchronization channel, the sidelink control channel (SLCCH, e.g., which may be used to provide SCI), and/or the sidelink shared channel (SLSCH, e.g., which may be used to provide data).

In 1008, the second UE 1004 may provide a sidelink RRM measurement report to the first UE 1002. The sidelink RRM measurement report may include sidelink carrier identifier/index, measurement identifier, measurement quantity, measurement result, etc. The sidelink RRM measurement report may be provided in an event-triggered or periodic manner, e.g., in accordance with the sidelink RRM measurement configuration.

Note that the sidelink RRM measurements and sidelink RRM measurement reports may not be used for mobility (e.g., handover, such as might be used when performing RRM for a Uu interface for infrastructure mode communication), since by the nature of a unicast sidelink wireless connection between a pair of wireless devices, the pair of devices performing the unicast sidelink wireless connection may be fixed. However, the wireless device receiving the sidelink RRM measurement reports may determine to reconfigure the unicast sidelink wireless connection in one or more of various possible ways based at least in part on the sidelink RRM measurement reports.

Figure 11:
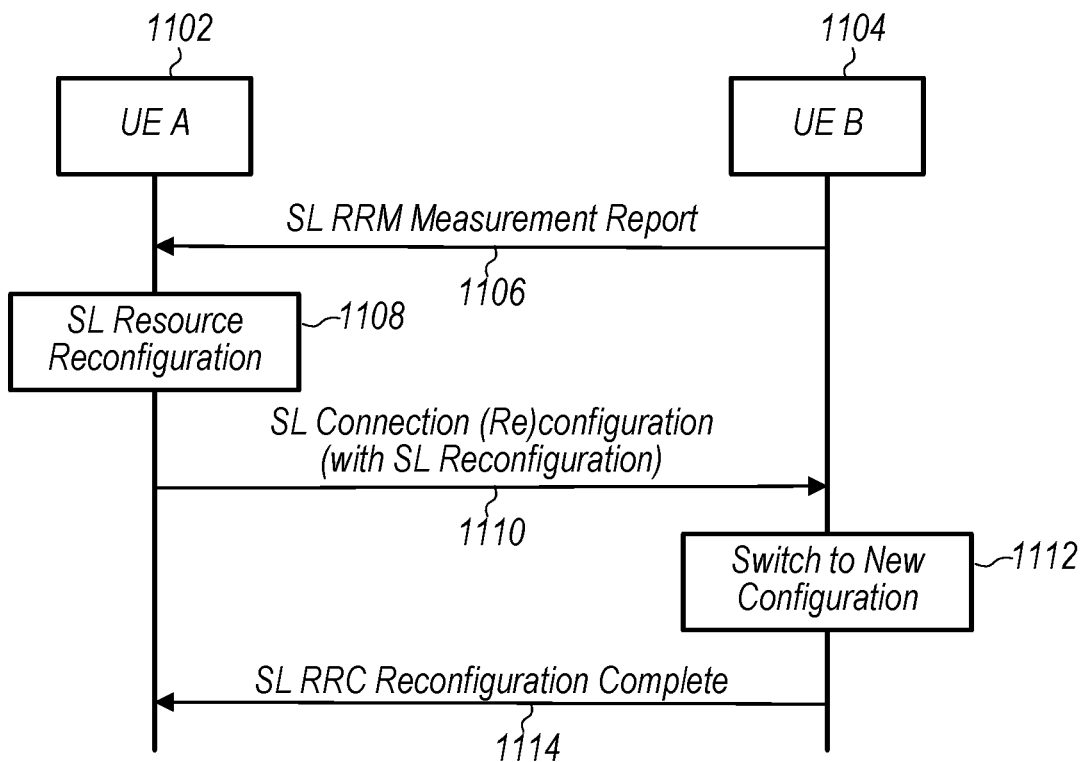

FIG. 11 is a communication flow diagram illustrating aspects of such an exemplary framework for reconfiguring a unicast sidelink wireless connection based on RRM measurement reports, at least according to some embodiments. A first UE 1102 and a second UE 1104 may have previously established a unicast sidelink wireless connection, e.g., including establishing a sidelink RRM measurement configuration in which the second UE 1104 provides sidelink RRM measurement reports to the first UE 1102. Accordingly, in 1106, the second UE 1104 may provide a sidelink RRM measurement report to the first UE 1102. In 1108, the first UE 1102 may determine to reconfigure resources for the unicast sidelink wireless connection, e.g., based at least in part on the sidelink RRM measurement report. In 1110, the first UE 1102 may provide sidelink connection (re)configuration information, e.g., reconfiguring the unicast sidelink wireless connection in accordance with its determination. In 1112, the second UE 1104 may switch to the new configuration. In 1114, the second UE 1104 may provide a sidelink reconfiguration complete indication to the first UE 1102 to complete the reconfiguration process.

The operations/reconfigurations determined and implemented by the first UE 1102 based on the sidelink RRM measurement report may include any or all of a variety of operations/reconfigurations. As one possibility, the unicast sidelink wireless connection may be switched to a different frequency. As another possibility, a modulation and coding scheme, transmit power, and/or number of re-transmissions configured for the unicast sidelink wireless connection may be modified. As still another possibility, a sidelink DRB (e.g., whose QoS requirements could not be met on its current carrier) may be switched to another carrier, and/or the sidelink DRB may be reconfigured with a more robust configuration, such as PDCP duplication. As yet another possibility, the resource pool used for the unicast sidelink wireless connection may be changed. Note that, at least according to some embodiments, an indication to an upper (e.g., non-access stratum) layer may be provided regarding the access stratum link status change.

As still another possibility for performing access stratum level connection maintenance, it may be possible for wireless devices performing unicast sidelink wireless communication to implement one or more physical layer detection based techniques. For example, a wireless device that has established a unicast sidelink wireless connection with another wireless device could monitor how many consecutive negative acknowledgements have been received by the wireless device via a unicast sidelink wireless connection during a certain time duration. The count could refer to each HARQ process separately or for all HARQ processes, according to various embodiments. In such an exemplary scenario, the wireless device might determine that link quality for the unicast sidelink wireless connection is poor when the number of consecutive negative acknowledgements that have been received via the unicast sidelink wireless connection within the specified time duration is greater than (or possibly at least equal to) a predetermined negative acknowledgement threshold.

As another example, the wireless device could monitor a channel quality indicator for the unicast sidelink wireless connection. In such an exemplary scenario, the wireless device might determine that link quality for the unicast sidelink wireless connection is poor when the channel quality indicator is below a certain channel quality indicator threshold for at least a certain time duration. Provided a sidelink reference signal continues to be transmitted under such conditions, the wireless device could similarly at a different time determine that the link quality is good when the channel quality indicator is above a certain channel quality indicator threshold for at least a certain time duration.

As still another example, the wireless device could monitor a channel state information report for a best beam of the unicast sidelink wireless connection. In such an exemplary scenario, the wireless device might determine that link quality for the unicast sidelink wireless connection is poor when the channel state information is below a certain channel state information threshold for at least a certain time duration. Provided a sidelink reference signal continues to be transmitted under such conditions, the wireless device could similarly at a different time determine that the link quality is good when the channel state information is above a certain channel state information threshold for at least a certain time duration.

Note that the preceding examples may be used individually or in combination, e.g., such that the link status could be determined based at least in part on any or all of the number of consecutive HARQ NACKs, the CQI status, and/or the CSI status for the unicast sidelink wireless connection, as desired. Note further that when reference is made to certain thresholds and time durations for determining whether the link quality for a unicast sidelink wireless connection is "good" or "poor", such thresholds and time durations may be similar or different for different measurement qualities and/or for determining whether the link status is "good" or "poor" for the same measurement quality, among various possibilities In conjunction with such access stratum level unicast sidelink maintenance techniques, it may also be useful to provide support for communicating link status information between upper (e.g., non-access stratum) and lower (e.g., access stratum) layers of a wireless device, at least according to some embodiments.

For example, at least according to some embodiments, the upper layer(s) of the wireless device may perform non-access stratum link maintenance (e.g., exchange of keep-alive messages) while a unicast sidelink wireless connection is established and may be responsible for disconnecting/releasing the unicast sidelink wireless connection, e.g., when data communication between the wireless device pair is complete. When such a unicast sidelink wireless connection is released by the upper layer(s), then, the upper layer(s) may provide an indication to the lower layer(s) of the wireless device that the one-to-one link is disconnected (or that a keep-alive timer for the link has expired). Thus, the access stratum level portion of the connection (e.g., the sidelink RRC connection) may be released automatically at each side, potentially without any need to explicitly release the sidelink RRC connection with sidelink RRC signaling.

It may also be useful for the access stratum layers to provide link status indications to the non-access stratum, at least according to some embodiments. Thus, for example, if the sidelink access stratum link is determined to be too poor to support data exchange, the access stratum layer of a wireless device may provide an indication of this to an upper layer of the wireless device. As a result, the upper layer may stop data transmission over the unicast sidelink wireless connection. Triggering conditions may include any of various possible conditions, potentially including any or all of sidelink RLF declaration, failure to re-establish a sidelink RRC connection after RLF, a sidelink RRM measurement result on the sidelink primary carrier (or all sidelink carriers) that is below a certain threshold for a certain duration, or a determination of poor link quality based on physical layer detection, among various possibilities. In some instances, the trigger condition to provide such an indication to the upper layer could require that multiple (e.g., some specified number of) continuous triggering conditions occur within a specified time duration, e.g., to allow for the possibility of access stratum link recovery within a certain time window (e.g., providing a guard timer function). In such a case, the indication of link failure may be provided to the upper layer if any access stratum link recovery techniques are unsuccessful, e.g., such that the higher layer can trigger its own link recovery techniques and/or release the unicast sidelink wireless connection.

In case access stratum link recovery is successful after an indication of link failure is provided to the upper layer, and/or for any of various other reasons, it may also be useful to support provision of an indication of link recovery from the access stratum to the upper layer, at least according to some embodiments. Such an indication could be triggered, for example, based on sidelink RRC re-establishment succeeding, or a sidelink RRM measurement result on the sidelink primary carrier (or all sidelink carriers) that is above a certain threshold for a certain duration, or a determination of good link quality based on physical layer detection, among various possibilities.

Based on such an indication, the upper layer may re-start data transmission if the one-to-one communication link for the unicast sidelink wireless connection is still maintained at the upper layer. Otherwise (e.g., if the upper layer one-to-one communication link for the unicast sidelink wireless connection has been released), the upper layer may trigger a new one-to-one communication link, if the unicast sidelink wireless connection is still needed or desired.

Thus, according to the techniques described herein, it may be possible to perform access stratum level maintenance of a unicast sidelink wireless connection, such as according to NR V2X, among various possibilities.

In the following further exemplary embodiments are provided.

One set of embodiments may include a first wireless device, comprising: at least one antenna for performing wireless communications; a radio coupled to the at least one antenna; and a processing element coupled to the radio; wherein the first wireless device is configured to: establish a unicast sidelink wireless connection with a second wireless device; and perform access stratum radio link monitoring for the unicast sidelink wireless connection, wherein to perform the access stratum radio link monitoring for the unicast sidelink wireless connection, the first wireless device is further configured to determine a radio link quality of the unicast sidelink wireless connection based on sidelink reference signals provided by the second wireless device.

According to some embodiments, the first wireless device is further configured to: determine that radio link failure of the unicast sidelink wireless connection has occurred; and continue to determine the radio link quality of the unicast sidelink wireless connection based on sidelink reference signals provided by the second wireless device after the radio link failure of the unicast sidelink wireless connection has occurred for a specified time duration for continuing to perform access stratum radio link monitoring for the unicast sidelink wireless connection after radio link failure has occurred.

According to some embodiments, the first wireless device is further configured to: determine that radio link failure of the unicast sidelink wireless connection has occurred; determine that no sidelink reference signals are available from the second wireless device after the radio link failure of the unicast sidelink wireless connection has occurred; and repeatedly transmit a sidelink wireless connection re-establishment request after the radio link failure of the unicast sidelink wireless connection has occurred based at least in part on determine that no sidelink reference signals are available from the second wireless device after the radio link failure of the unicast sidelink wireless connection has occurred.

According to some embodiments, the first wireless device is further configured to: determine that radio link failure of the unicast sidelink wireless connection has occurred; maintain access stratum context information for the unicast sidelink wireless connection with the second wireless device for at least a predetermined length of time after the radio link failure of the unicast sidelink wireless connection has occurred, wherein the access stratum context information includes at least wireless device identifier information for the second wireless device.

According to some embodiments, the first wireless device is further configured to: provide sidelink reference signals for the unicast sidelink wireless connection with the second wireless device.

According to some embodiments, the sidelink reference signals for the unicast sidelink wireless connection with the second wireless device are provided for a specified time duration after radio link failure of the unicast sidelink wireless connection is declared.

According to some embodiments, the first wireless device is further configured to stop providing sidelink reference signals for the unicast sidelink wireless connection with the second wireless device after radio link failure of the unicast sidelink wireless connection is declared.

According to some embodiments, the first wireless device is further configured to: provide indications of changes in the radio link quality of the unicast sidelink wireless connection to a non-access stratum layer of the first wireless device.

Another set of embodiments may include an apparatus, comprising: a processing element configured to cause a first wireless device to: establish a unicast sidelink wireless connection with a second wireless device; perform access stratum radio resource management for the unicast sidelink wireless connection, wherein to perform the access stratum radio resource management for the unicast sidelink wireless connection, the first wireless device is further configured to: measure a plurality of characteristics of the unicast sidelink wireless connection, wherein the plurality of characteristics of the unicast sidelink wireless connection include at least a channel busy ratio of a channel on which the unicast sidelink wireless connection is established; and provide a radio resource management measurement report to the second wireless device based at least in part on measuring the plurality of characteristics of the unicast sidelink wireless connection.

According to some embodiments, the processing element is further configured to cause the first wireless device to: receive an indication to reconfigure the unicast sidelink wireless connection from the second wireless device based at least in part on the radio resource management measurement report.

According to some embodiments, the indication to reconfigure the unicast sidelink wireless connection indicates to perform one or more of: switching the unicast sidelink wireless connection to a different frequency; modifying a configured transmission power for the unicast sidelink wireless connection; modifying a configured number of retransmissions for the unicast sidelink wireless connection; modifying a modulation and coding scheme for the unicast sidelink wireless connection; switching a data radio bearer of the unicast sidelink wireless connection to a different carrier; modifying a packet data convergence protocol (PDCP) duplication configuration of a data radio bearer of the unicast sidelink wireless connection; or changing a resource pool for the unicast sidelink wireless connection.

According to some embodiments, the processing element is further configured to cause the first wireless device to: receive a radio resource management measurement report from the second wireless device; and determine to reconfigure the unicast sidelink wireless connection based at least in part on the radio resource management measurement report received from the second wireless device.

According to some embodiments, the processing element is further configured to cause the first wireless device to: provide an indication of a link status of the unicast sidelink wireless connection with the second wireless device to a non-access stratum layer of the first wireless device.

According to some embodiments, the processing element is further configured to cause the first wireless device to: receive an indication from a non-access stratum layer of the first wireless device that the unicast sidelink wireless connection with the second wireless device has been released at the non-access stratum layer of the first wireless device; and release a radio resource control connection of the unicast sidelink wireless connection with the second wireless device based at least in part on the indication from the non-access stratum layer of the first wireless device that the unicast sidelink wireless connection with the second wireless device has been released at the non-access stratum layer of the first wireless device.

Yet another set of embodiments may include a method, comprising: by a first wireless device: establishing a unicast sidelink wireless connection with a second wireless device; performing physical layer link quality detection for the unicast sidelink wireless connection; and providing link status updates for the unicast sidelink wireless connection with the second wireless device to a non-access stratum layer of the first wireless device when link quality crosses a predetermined link quality threshold.

According to some embodiments, performing the physical layer link quality detection for the unicast sidelink wireless connection includes monitoring a number of consecutive negative acknowledgements that have been received via the unicast sidelink wireless connection with the second wireless device, wherein the method further comprises: determining that the link quality is poor based at least in part on the number of consecutive negative acknowledgements that have been received via the unicast sidelink wireless connection with the second wireless device within a predetermined time duration being greater than a predetermined negative acknowledgement threshold.

According to some embodiments, performing the physical layer link quality detection for the unicast sidelink wireless connection includes monitoring a channel quality indicator for the unicast sidelink wireless connection with the second wireless device, wherein the method further comprises: determining that the link quality is poor based at least in part on the channel quality indicator for the unicast sidelink wireless connection with the second wireless device being below a first predetermined channel quality indicator threshold for at least a first predetermined time duration.

According to some embodiments, the method further comprises, at a different time than determining that the link quality is poor: determining that the link quality is good based at least in part on the channel quality indicator for the unicast sidelink wireless connection with the second wireless device being above a second predetermined channel quality indicator threshold for at a second predetermined time duration.

According to some embodiments, performing the physical layer link quality detection for the unicast sidelink wireless connection includes monitoring a channel state information report for a best beam of the unicast sidelink wireless connection with the second wireless device, wherein the method further comprises: determining that the link quality is poor based at least in part on the channel state information for the best beam of the unicast sidelink wireless connection with the second wireless device being below a first predetermined channel state information threshold for at least a first predetermined time duration.

According to some embodiments, the method further comprises, at a different time than determining that the link quality is poor: determining that the link quality is good based at least in part on the channel state information for the best beam of the unicast sidelink wireless connection with the second wireless device being above a second predetermined channel state information threshold for at a second predetermined time duration.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

As described above, one aspect of the present technology is the gathering and use of data available from specific and legitimate sources to improve coordination of traffic flow in traffic environments. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data may be used to better harmonize traffic flow in the user's environment, such that transportation of the user and other users becomes more efficient. Further, the personal data may improve safety of the user (and other users) by averting traffic accidents, particularly vehicular collisions. For example, in the case of a pedestrian user, the personal information, particularly movement- and position-related information, may operate to avert potentially fatal collisions between vehicles and the user. Also, the personal information may be usable to reduce resource and power consumption by user devices benefiting from traffic-related networks, which may improve users' experiences.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data for use in vehicle- and transportation-related networks. In another example, users can select not to provide certain personal data, such as location or movement data, to V2X networks for traffic safety and coordination purposes. In yet another example, users may be able to select to limit the length of time or degree to which traffic-associated data is maintained or entirely block the development of a baseline traffic or vehicle profile. In addition to providing "opt in" and "opt out" options, the present disclosure contemplates providing notifications relating to the access or use of personal information. For instance, a user may be notified that their personal information data will be accessed for use in vehicle and transportation networks.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. An apparatus, comprising:
a memory; and
a processor in communication with the memory and configured to cause a first wireless device to:
establish a unicast sidelink wireless connection with a second wireless device; and
perform access stratum measurements for the unicast sidelink wireless connection, wherein to perform the access stratum measurements for the unicast sidelink wireless connection, the first wireless device is further configured to:
measure a plurality of characteristics of the unicast sidelink wireless connection, wherein the plurality of characteristics of the unicast sidelink wireless connection include at least a sidelink reference signal received power (SL RSRP); and
provide a measurement report to the second wireless device based at least in part on measuring the plurality of characteristics of the unicast sidelink wireless connection;
receive, by an access stratum layer of the first wireless device, an indication from an upper layer of the first wireless device that the unicast sidelink wireless connection with the second wireless device has been released at the upper layer of the first wireless device; and
release a radio resource control connection of the unicast sidelink wireless connection with the second wireless device based at least in part on the indication from the upper layer of the first wireless device.

2. The apparatus of claim 1, wherein the processor is further configured to cause the first wireless device to:
  receive an indication to reconfigure the unicast sidelink wireless connection from the second wireless device based at least in part on the measurement report.
3. The apparatus of claim 2, wherein the indication to reconfigure the unicast sidelink wireless connection indicates to perform one or more of:
  switching the unicast sidelink wireless connection to a different frequency;
  modifying a configured number of re-transmissions for the unicast sidelink wireless connection;
  modifying a modulation and coding scheme for the unicast sidelink wireless connection;
  switching a data radio bearer of the unicast sidelink wireless connection to a different carrier;
  modifying a packet data convergence protocol (PDCP) duplication configuration of a data radio bearer of the unicast sidelink wireless connection; or
  changing a resource pool for the unicast sidelink wireless connection.
4. The apparatus of claim 1, wherein the processor is further configured to cause the first wireless device to:
  receive a second measurement report from the second wireless device; and
  determine to modify a configured transmission power for the unicast sidelink wireless connection based at least in part on the second measurement report received from the second wireless device.
5. The apparatus of claim 1, wherein the processor is further configured to cause the first wireless device to:
  provide an indication of a link status of the unicast sidelink wireless connection with the second wireless device from an access stratum layer of the first wireless device to an upper layer of the first wireless device.
6. The apparatus of claim 1, wherein the measurement report causes modification by the second wireless device of a transmission power for the unicast sidelink wireless connection.
7. A first wireless device, comprising:
  a radio;
  a processor operably coupled to the radio, wherein the first wireless device is configured to:
    establish a unicast sidelink wireless connection with a second wireless device; and
    perform access stratum measurements for the unicast sidelink wireless connection, wherein to perform the access stratum measurements for the unicast sidelink wireless connection, the first wireless device is further configured to:
      measure a plurality of characteristics of the unicast sidelink wireless connection, wherein the plurality of characteristics of the unicast sidelink wireless connection include at least a sidelink reference signal received power (SL RSRP); and
      provide a measurement report to the second wireless device based at least in part on measuring the plurality of characteristics of the unicast sidelink wireless connection;
    receive, by an access stratum layer of the first wireless device, an indication from an upper layer of the first wireless device that the unicast sidelink wireless connection with the second wireless device has been released at the upper layer of the first wireless device; and
    release a radio resource control connection of the unicast sidelink wireless connection with the second wireless device based at least in part on the indication from the upper layer of the first wireless device.
8. The first wireless device of claim 7, wherein the first wireless device is further configured to:
  receive an indication to reconfigure the unicast sidelink wireless connection from the second wireless device based at least in part on the measurement report.
9. The first wireless device of claim 8, wherein the indication to reconfigure the unicast sidelink wireless connection indicates to perform one or more of:
  switching the unicast sidelink wireless connection to a different frequency;
  modifying a configured number of re-transmissions for the unicast sidelink wireless connection;
  modifying a modulation and coding scheme for the unicast sidelink wireless connection;
  switching a data radio bearer of the unicast sidelink wireless connection to a different carrier;
  modifying a packet data convergence protocol (PDCP) duplication configuration of a data radio bearer of the unicast sidelink wireless connection; or
  changing a resource pool for the unicast sidelink wireless connection.
10. The first wireless device of claim 7, wherein the first wireless device is further configured to:
  provide an indication of a link status of the unicast sidelink wireless connection with the second wireless device from an access stratum layer of the first wireless device to an upper layer of the first wireless device.
11. The first wireless device of claim 7, wherein the measurement report causes modification by the second wireless device of a configured transmission power for the unicast sidelink wireless connection.
12. A method for operating a first wireless device, the method comprising:
  establishing a unicast sidelink wireless connection with a second wireless device; and
  performing access stratum measurements for the unicast sidelink wireless connection, wherein performing the access stratum measurements for the unicast sidelink wireless connection comprises:
    measuring a plurality of characteristics of the unicast sidelink wireless connection, wherein the plurality of characteristics of the unicast sidelink wireless connection include at least a sidelink reference signal received power (SL RSRP); and
    providing a measurement report to the second wireless device based at least in part on measuring the plurality of characteristics of the unicast sidelink wireless connection;
  receiving an indication from an upper layer of the first wireless device that the unicast sidelink wireless connection with the second wireless device has been released at the upper layer of the first wireless device; and
  releasing a radio resource control connection of the unicast sidelink wireless connection with the second wireless device based at least in part on the indication from the upper layer of the first wireless device.
13. The method of claim 12, the method further comprising:
  receiving an indication to reconfigure the unicast sidelink wireless connection from the second wireless device based at least in part on the measurement report.
14. The method of claim 13, wherein the indication to reconfigure the unicast sidelink wireless connection indicates to perform one or more of:

switching the unicast sidelink wireless connection to a different frequency;
modifying a configured number of re-transmissions for the unicast sidelink wireless connection;
modifying a modulation and coding scheme for the unicast sidelink wireless connection;
switching a data radio bearer of the unicast sidelink wireless connection to a different carrier;
modifying a packet data convergence protocol (PDCP) duplication configuration of a data radio bearer of the unicast sidelink wireless connection; or
changing a resource pool for the unicast sidelink wireless connection.

15. The method of claim 12, the method further comprising:
receiving a second measurement report from the second wireless device; and
determining to modify a configured transmission power for the unicast sidelink wireless connection based at least in part on the second measurement report received from the second wireless device.

16. The method of claim 12, the method further comprising:
providing an indication of a link status of the unicast sidelink wireless connection with the second wireless device to an upper layer of the first wireless device.

17. The method of claim 12,
wherein the measurement report causes modification by the second wireless device of a transmission power for the unicast sidelink wireless connection.

18. The apparatus of claim 5,
wherein the indication of the link status indicates that the unicast sidelink wireless connection with the second wireless device cannot support data exchange.

19. The first wireless device of claim 10,
wherein the indication of the link status indicates that the unicast sidelink wireless connection with the second wireless device cannot support data exchange.

20. The method of claim 16,
wherein the indication of the link status indicates that the unicast sidelink wireless connection with the second wireless device cannot support data exchange.

\* \* \* \* \*